Figure 1:
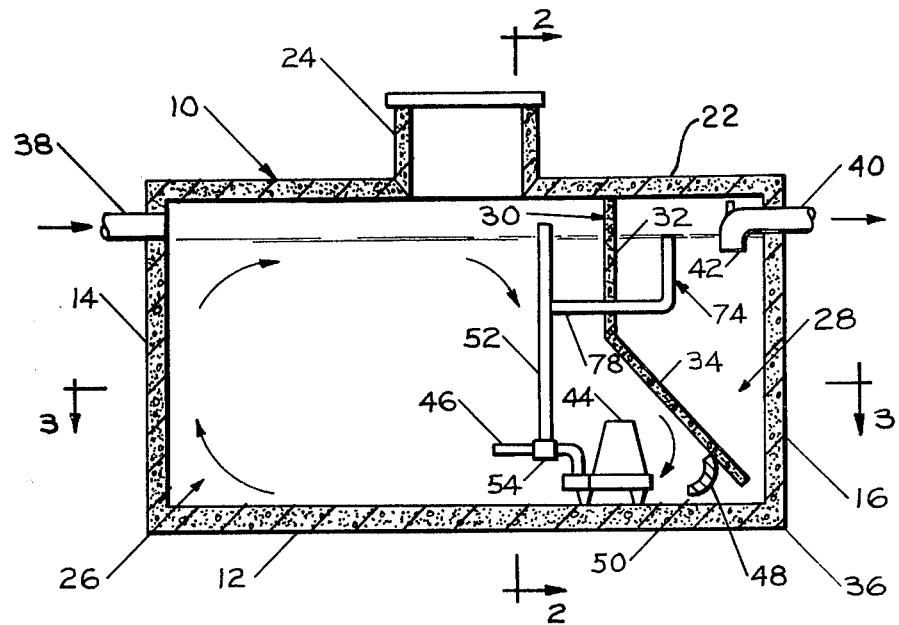

ined Stated Patent [19]

Wilson

[11] 4,093,549
[45] June 6, 1978

[54] AERATOR SEWAGE TANK

[76] Inventor: Harold L. Wilson, Antonia, Mo. 63052

[21] Appl. No.: 763,892

[22] Filed: Jan. 31, 1977

[51] Int. Cl.² .............................................. C02C 1/06
[52] U.S. Cl. ................................ 210/195 S; 210/197; 210/218; 210/220
[58] Field of Search ................... 210/170, 195 S, 197, 210/218, 220, 221 R, 532 S; 239/428.5; 261/76, 78 A, DIG. 75

[56] References Cited

U.S. PATENT DOCUMENTS

| 1,526,179 | 2/1925 | Parr et al. | 261/DIG. 75 |
| 1,662,101 | 3/1928 | Bossi | 261/76 |
| 2,029,666 | 2/1936 | Markwart | 261/76 X |
| 2,635,006 | 4/1953 | Richmond | 239/428.5 X |
| 2,852,140 | 9/1958 | MacLaren | 210/221 R |
| 2,889,009 | 6/1959 | Endebak et al. | 261/78 A X |
| 2,889,047 | 6/1959 | Coate | 210/197 |
| 2,987,186 | 6/1961 | Burgoon et al. | 210/197 |
| 3,195,727 | 7/1965 | Kibbee | 210/195 S |
| 3,210,053 | 10/1965 | Boester | 210/220 X |
| 3,216,573 | 11/1965 | Irion | 210/220 |
| 3,234,880 | 2/1966 | Hampton | 210/195 S X |
| 3,618,779 | 11/1971 | Goodman | 210/195 S |
| 3,709,527 | 1/1973 | Nations | 210/532 S X |
| 3,804,255 | 4/1974 | Speece | 210/218 X |
| 3,951,817 | 4/1976 | Snyder | 210/220 X |

OTHER PUBLICATIONS

"Eco-Robic, The Healthy & Scientific Way to Live", Eco-Robic Products, Div. of American Sanitary Laboratories, Inc., Imperial, Mo. Eco-Robic Ventari.

Primary Examiner—Charles N. Hart
Assistant Examiner—Robert H. Spitzer
Attorney, Agent, or Firm—Glenn K. Robbins

[57] ABSTRACT

A sewage treatment tank for aeration of raw sewage. The tank comprises an aeration compartment and a clarifying compartment separated by a vertical baffle-like wall having a steeply inclined lower portion which provides a hopper-like bottom in the clarifier compartment. A submerged pump is provided in the aeration compartment having an outlet discharging into the aeration compartment with specially devised aspirating means for drawing air through the outlet by aspiration to mix with the raw sewage discharged through the outlet to provide a high velocity air fluid stream for aerobic treatment. A separate curved baffle at the bottom of the lower portion of the vertical baffle imparts a circular roll-like stream to the aerating stream and by close spacing to the tank bottom provides a narrow throat-like passage to the clarifier compartment which facilitates drawing any heavy solids therein back to the aerating compartment for further treatment. The ratio of the aeration compartment volume to clarifier compartment ranges from greater than 1 to 1 to as much as 5 to 1 to provide for extensive aeration. A specially devised skimmer to skim solids from the clarifier compartment by aspiration is provided at the discharge side of the pump.

11 Claims, 9 Drawing Figures

AERATOR SEWAGE TANK

SUMMARY OF THE INVENTION

The treatment tank of this invention has been devised to provide for aerobic attack on raw sewage as a modification of the activated sludge treatment process. The treatment tank is devised to take the place of septic tanks and improve upon existing aeration tanks to effect more extensive aeration and more efficient air mixing with raw sewage discharge from a treatment pump in the tank. The tank is specially designed to meet the needs of the average householder and to provide 24 hours of retention of sewage for a population equivalent of up to eight persons.

The treatment tank is comprised of an aeration compartment and a clarifier compartment in which the volumetric ratio is greater than 1 to 1 up to 5 to 1. This ratio of larger volume of aeration compartment as compared to the clarifier compartment provides for more efficient and extensive aeration in the aerobic treatment of the sewage.

A vertical baffle separates the aeration compartment from the clarifier compartment. The lower portion of this baffle is steeply inclined toward the clarifier compartment and terminates at a closely spaced position from the juncture of an end wall of the clarifier compartment and the tank to provide a funnel-shaped or hopper-like bottom to concentrate heavier than water solids at the bottom. A pump operating intermittently on a timed cycle is positioned at the bottom of the aeration compartment and a narrow slot-like passage is provided at the bottom of the lower portion of the baffle to provide for flow of fluid between the aeration compartment and the clarifier compartment. Any solids such as sand particles or the like passing between the two compartments are readily picked up by suction from the pump and the aspirating effect by the aerating stream from the pump which discharges fluid through an outlet conduit in the aeration compartment.

A separate curved baffle at the bottom of the lower portion of the vertical baffle imparts a circular roll-like stream to the aerating stream and by close spacing to the tank bottom provides a narrow throat-like passage to the clarifier compartment which facilitates drawing any heavy solids therein back to the aerating compartment for further treatment.

The outlet conduit of the pump is provided with an aspirating tube or conduit extending above the liquid level in the aeration compartment. This conduit has a specially designed restricted area throat positioned within the inside of the outlet conduit which increases the velocity of fluid flow past the air conduit to provide means for aspirating air by venturi action through the conduit. Air is mixed in the form of micro bubbles with the raw sewage discharge into the aeration compartment.

A skimmer tube or conduit is connected to the air conduit and has an opening communicating with the fluid level in the clarifier compartment and may be adjustable fo skimming solid matter from the surface. Thus the aspiration provided by the high velocity discharge of fluid through the outlet conduit of the pump not only draws air required for aeration but also is used to skim solid particles in the skimming means.

The above features are objects of this invention and further objects will appear in the detailed description which follows and will be otherwise apparent to those skilled in the art.

For the purpose of illustration of this invention there is shown in the accompanying drawings a preferred embodiment thereof. It is to be understood that these drawings are for the purpose of illustration only and that the invention is not limited thereto.

IN THE DRAWINGS

Figure 2:
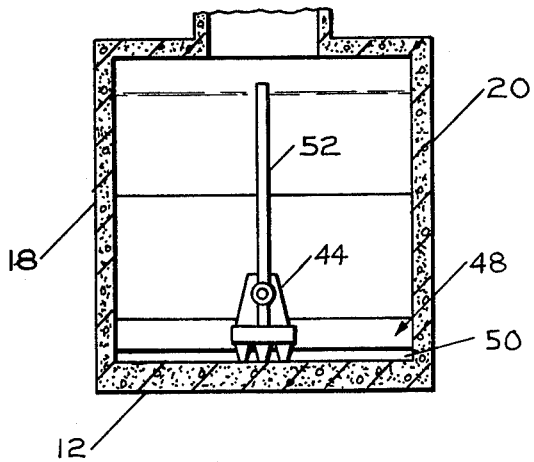
Figure 3:
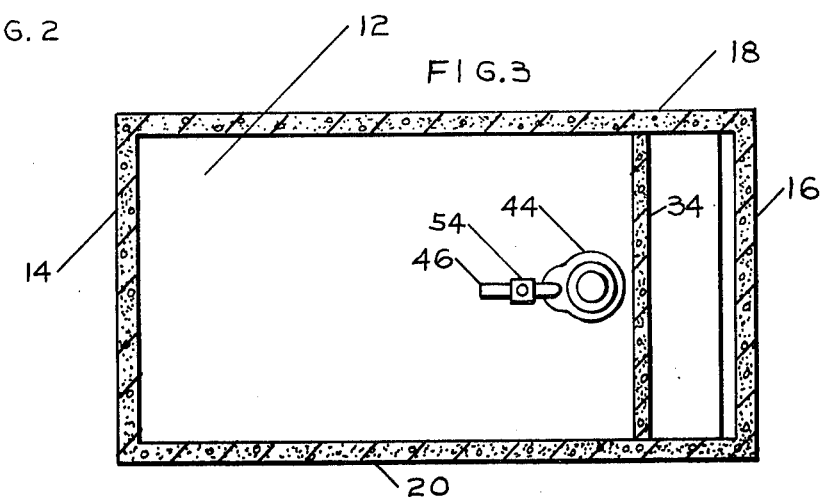
Figure 9:
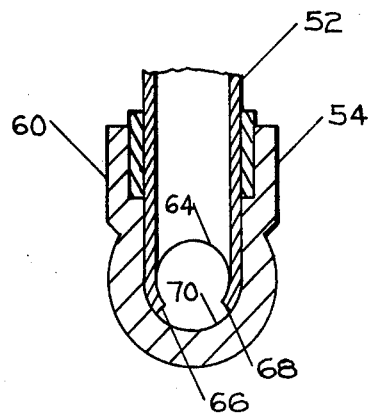
Figure 4:
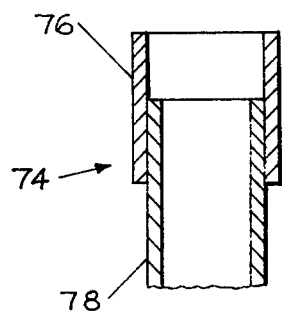
Figure 5:
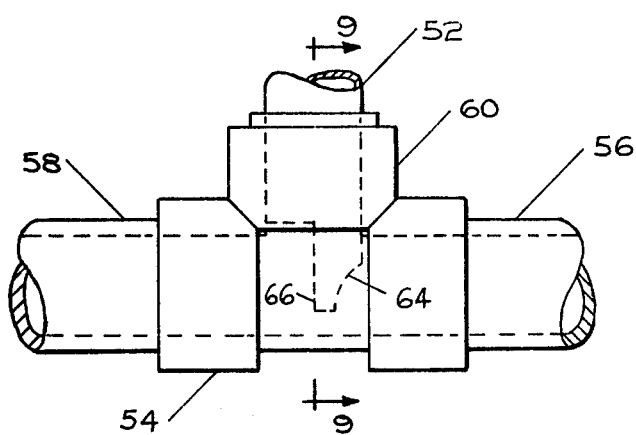
Figures 6, 7, 8:
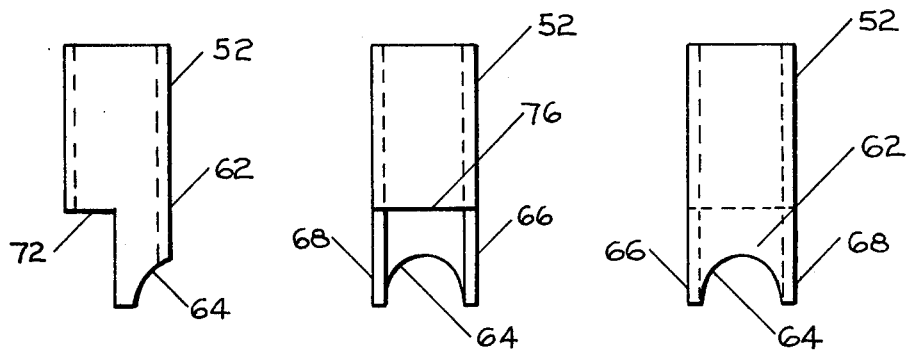

FIG. 1, is a view in longitudinal vertical cross-section taken through the center of the tank, FIG. 2, is a view in lateral vertical cross-section of the tank taken on line 2—2 of FIG. 1, FIG. 3, is a view in horizontal cross-section taken on line 3—3 of FIG. 1, FIG. 4, is an enlarged view in section taken through the axis of the skimmer tube, FIG. 5, is an enlarged view in elevation showing the interior construction in dotted lines of the connection of the vertical conduit to the pump outlet, FIG. 6, is an enlarged view in front elevation of the bottom of the vertical air conduit showing the throat construction, FIG. 7 is a view in side elevation of the bottom of the air conduit taken from the left side of FIG. 5, FIG. 8, is a view in side elevation of the bottom of the air conduit taken from the right side of FIG. 5; and FIG. 9, is a view in section taken on the line 9—9 of FIG. 5.

DESCRIPTION OF THE INVENTION

The treatment tank of this invention is generally indicated by the reference numeral 10 in FIG. 1. It is comprised of a bottom wall 12, end wall 14 and 16 and two side walls 18 and 20 and a top 22. An elevated manhole structure 24 is provided for access when the tank is buried in the ground.

The treatment tank is divided into an aeration compartment 26 and a clarifier compartment 28 by a transverse baffle 30 having a vertical top portion 32 and a lower portion 34 steeply inclined toward a corner of the tank and ends a short distance therefrom to provide a slot-like opening between the two compartments. The incline of the lower portion 34 is quite steep to funnel solids to the opening for withdrawal by suction back to The aeration compartment and an angle of 56° from the horizontal has been found desirable. An inlet 38 is provided at the top of the tank. An elbow-like outlet 40 has a bottom portion 42 pointed downwardly below the fluid level of the tank to prevent the discharge of any solid matter floating on the top of the tank.

In order to provide for circulation and movement of sewage and aeration a submerged pump 44 is provided which is positioned on the bottom wall of the aeration compartment. This pump is of conventional construction such a Peabody Barnes Model SE51 pump having a bottom inlet in the middle of the pump which receives by suction fluid at the bottom. A discharge outlet 46 is directed parallel to the bottom wall and toward the end wall 14 to discharge aerated fluid so as to provide clockwise roll or circulation in the direction of the arrows shown in FIG. 1 in the aeration compartment between the end wall 14 and the baffle 30. Fluid flow between the aeration compartment and the clarifier compartment takes place through the slot-like opening between the lower baffle portion 34 and the corner 36 of the tank as best shown in FIGS. 1 and 2.

The roll-like circulation and aspiration of any solids in the clarifier compartment is enhanced by curved foil 48 which is connected to the lower baffle portion 34 and terminates just slightly above the floor 12 of the tank to provide a narrow slot-like opening or throat 50. Thus the combined action of the velocity of the circulating stream in the aeration compartment and the suction of the pump inlet which is positioned adjacent the throat 50 as shown in FIGS. 1, 2 and 3 effects an efficient withdrawal of solids from the clarifier compartment to furnish an improved clarity to the ultimate effluent.

The mixing of air for aeration of the sewage is effected by aspiration through vertical conduit 52 best shown in FIGS. 1 and 5 through 7. This conudit is connected to the outlet conduit of the pump through a tee-sleeve connection 54. The sleeve connection receives an upstream conduit 56 at one end and a downstream conduit portion 58 at the other end. A top socket 60 receives the vertical conduit 52 at the bottom end in a sliding friction fit. The socket 60 has an internal diameter only slightly larger than the external diameter of the conduit 52 in order to provide a friction fit and seat the bottom of the conduit in proper registry as will further be explained more fully below. This conduit as well as the tee-sleeve connection and the outlet conduit may be conveniently made of plastic pipe which resists corrosion and chemical attack although other materials of construction may be employed. The top end of the air conduit extends above the fluid level in the aeration compartment for reception of air and its eduction and mixing with the pumped fluid by aspiration through the high velocity of the fluid passing through a restricted throat means in the outlet conduit.

The bottom of the air conduit is specially constructed to provide the restricted throat means for aspirating air and mixing with the raw sewage fluid in the outlet conduit. This is achieved by an upstream solid wall portion 62 which has a concave configuration 64 terminating at the bottom in a pair of opposed foot portions 66 and 68 as best shown in FIGS. 7 and 8. The foot portions rest on the lower portion of the inside wall 70 of the outlet conduit in the tee-connection 54 and may be bent inwardly to a slight degree through the flexing of the plastic pipe to position the vertical conduit in proper registry as best appears in FIGS. 5 and 9. The downstream side wall portion of the air conduit has a transverse bottom edge 72 which extends across the upper part of the side wall of the outlet conduit to define the restricted area throat and an area for expansion downstream of the thoat as best shown in FIGS. 5, 6 and 7. This provides for the introduction of air to the high velocity fluid flow caused by the restricted throat to affect aspiration of air in the outlet conduit into the aeration compartment.

A skimmer 74 is connected to the vertical air conduit to provide for skimming of floating solids in the clarifier compartment and then evacuation of the solids through the conduit 50 and pump outlet 46 back to the aeration compartment. This is effected by a top portion 76 and a bottom L-shaped portion 78 connected to the vertical air conduit through the baffle. The connection of the two tubes 76 and 78 is by a sliding friction fit for ready adjustment but it will be understood that a simple threaded connection or other conventional means for adjustment may be used as desired.

USE

Raw sewage is introduced to the treatment tank through the inlet 38 where it enters the aeration compartment. In the aeration compartment the sewage meets the viable population of organism provided in the aerobic system in the activated sludge of the process. The activated sludge and raw sewage are mixed in a general clockwise roll circulation action as shown in FIG. 1 by the arrows in the aeration compartment for a period of approximately 24 hours. This mixing is effected by the discharge of the aerated liquid through the discharge 46 of the pump 44. During normal daytime hours the pump is operated on cycles of 15 minutes every hour. During hours of less sewage discharge activites such as late evening or early morning hours the pump operation can be operated for lesser periods and for extra heavy sewage discharge operation can be for greater periods of time. Such operation is effected by setting of conventional timing controls which will be well understood in the art and form no part of this invention. This provides roughly 24 hours of retention for a population equivalent loading of 8 persons based on a general use of 90 gallons a day per person and is in general accordance with the minimum standatds contained in the "Recommended Standards for Sewage Work", a report of Committee of the Great-Lakes Upper Mississippi River Board of Sanitary Engineers as published by the Health Education Service, Albany, N.Y. and known generally as the "Ten States Standards".

In the process the aerated liquid passes through the openings under the curved foil 48 and the baffle portion 34 into the clarifier compartment where any heavier than water solids generally settle by gravity to the hopper-like bottom. The clear liquid passes out of the tank through effluent pipe 40 to disposal. Any settled solids in the clarifier compartment are drawn back into the intake of the pump 44 in the aeration cycle during the pump operation and is returned to the aeration tank to meet newly incoming raw waste. Any floating solids in the clarifier compartment are removed by the skimmer.

The liquid of the aeration tank for purpose of example may be the volume of approximately 763 gallons while the volume of the clarifier compartment is approximately 166 gallons. Thus a 1000 gallon tank can be desirably dimensioned as so described and still provide air space above the liquid level. These ranges can be varied from a point where the aeration compartment is slightly greater than the volume of the clarifier compartment up to a point where this ratio is 5 to 1.

The treatment tank is so designed that the aerating chamber or compartment is supplied with air aspirated or educted into the pump through the specially designed restricted throat area of the air conduit as particularly shown in FIGS. 5 through 9. The air aspirated or educted into the outlet stream of the pump is in the form of macro-bubbles. As the pressure is reduced at the discharge end of the pump outlet 46 the bubbles expand in size to macro-bubbles to impact against one another repeatedly, fracturing the bubbles into smaller and smaller units, and increasing the external surface of the bubbles and allowing greater air to water interface for more efficient aerobic attack of the sewage.

The discharge of the aerating pump into the aerating tank is so directed as to produce the afore-mentioned roll or clockwise circulating action in the aeration compartment. This enhances the mixing of the bio-floc and influent raw waste and produces the best opportunity for the biological population to meet with the food source in the raw waste.

The eduction of aspiration of air effected through the vertical air conduit to the pump outlet is capable of supplying an ample amount of air during the time the pump is operating. The extended air design criteria calls for 2000 cubic feet of air per point of $BOD_5$ per day and is operated on the afore-mentioned population load of 8 persons. The unit can handle 1.25 pounds of $BOD_5$ input which provides for an eight family unit corresponding to a BOD of 0.167 pounds per person. The air input through the vertical air reductor conduit is sufficient to maintain dissolved oxygen levels in excess of 5 milligrams per liter. The unit is capable of delivering in excess of 4000 cubic feet of air per pound of $BOD_5$ per day if operated continuously.

Various changes and modifications may be made within this invention as will be readily apparent to those skilled in the art. Such changes and modifications are within the scope and teaching of this invention as defined by the claims appended hereto.

What is claimed is:

1. A sewage treatment tank comprising an aeration compartment and a pump, said pump having an inlet receiving fluid and an outlet for discharging said fluid, means for aerating fluid discharged through the outlet of said pump comprising a pipe-like vertical conduit connected to a horizontal outlet conduit from said pump at a lower end and extending above the fluid level in the tank at an upper end for drawing air through said conduit by aspiration and mixing with the raw sewage pumped through the outlet of the pump to the aerating compartment, the lower end of the vertical conduit having an upstream side wall having a concave bottom protruding into an outlet conduit from said pump to provide a resticted area throat to increase the velocity of fluid flow past the vertical air conduit for aspirating air through said conduit and mix said air with the raw sewage fluid in said outlet conduit and said upstream side wall has a concave configuration terminating at the bottom in a pair of opposed foot portions which rest on the inside wall of said outlet conduit to position the vertical conduit therein in proper registry.

2. The treatment tank of claim 1, in which the lower end of the vertical conduit has a downstream side wall which extends across the upper part of the inside wall of the outlet conduit and above the restricted area throat to provide an expanded area for the mixing air and raw sewage passing past said throat.

3. The treatment tank of claim 2, in which the vertical conduit is connected to the outlet conduit in a tee-connection socket means, the internal diameter of the outlet conduit having a slightly greater diameter than the external diameter of the vertical conduit in order that the foot portions can rest on the lower portion of the inside wall of the outlet conduit.

4. The treatment tank of claim 1, in which the vertical conduit is connected to the outlet counduit in a tee-connection socket means, the internal diameter of the outlet conduit having a slightly greater diameter than the external diameter of the vertical conduit in order that the bottom of the vertical conduit can rest on the lower portion of the inside wall of the outlet conduit.

5. A sewage treatment tank comprising an aerating compartment and a clarifier compartment separated by a vertical baffle dividing the tank into said compartments, an inlet for raw fluid sewage opening into said tank at an upper portion of said aeration compartment and an outlet for aerated fluid at an upper portion of said clarifier compartment, a submerged pump in said tank supported on a floor of said tank and having an inlet receiving fluid adjacent the floor and an outlet in said aerating compartment to discharge fluid in a direction parallel to the floor and opposite the inlet to provide a roll-like circulation in the aerating compartment, passage means at a lower portion of said baffle between the baffle and the floor for fluid flow between said compartments adjacent said pump inlet and means for aerating the fluid discharge through the outlet of said pump comprising a vertical conduit connected to an outlet conduit from said pump at a lower end and extending above the fluid level in the tank at an upper end for drawing air through said conduit by aspiration and mixing with the raw sewage pumped through the outlet of the pump to the aerating compartment, the baffle having an upper wall portion extending across opposite sides of the tank above the fluid level and a lower portion extending at an angle toward a vertical end wall of the clarifier compartment and terminating a short distance above the floor to provide a steep incline hopper-like surface to funnel any heavier than water solid particles upon the floor of the tak and provide said forementioned passage means between the compartments and provide for ready introduction by suction of said particles into said pump inlet.

6. The treatment tank of claim 5, in which an arcuate baffle is positioned at the bottom of the lower portion of said baffle and extends across the sides of said tank to facilitate an internal circular roll-like flow of aerating fluid in said tank effected by discharge of said fluid at high velocity from the pump.

7. The treatment tank of claim 5, in which the bottom edge of said baffle is in close proximity to a vertical end wall of said tank to define a funnel shaped hopper-like structure in the clarifier compartment.

8. The treatment tank of claim 7, in which an arcuate baffle is possitioned at the bottm of the lower portion of said baffle and extends across the sides of said tank to facilitate the internal circular roll-like flow of aerating fluid in said tank effected by discharge of said fluid at high velocity from the pump.

9. The treatment tank of claim 5, in which the vertical conduit is removable and lower end of the conduit has an upstream side wall protruding into an outlet conduit from said pump to provide a restricted area throat to increase the velocity of fluid flow past the vertical air conduit for asporating air through said conduit and mix said air with the raw sewage fluid in said outlet conduit, the upstream side wall has a concave configuration terminating at the bottom in a pair of opposed foot portions which rest on the inside wall of said outlet conduit to position the vertical conduit therein in proper registry and the lower end of the vertical conduit has a downstream side wall which extends across the upper part of the inside wall of the outlet conduit and above the restricted area throat to provide an expanded area for the mixed air and raw sewage passing past said throat.

10. A sewage treatment tank comprising an aeration compartment and a clarifier compartment separated by a vertical baffle dividing the tank into said compartments, an inlet for raw fluid sewage opening into said tank at an upper portion of said aeration compartment and an outlet for aerated fluid at an upper portion of said clarifier compartment, a submerged pump in said tank supported on a floor of said tank and having an inlet adjacent the floor receiving fluid and an outlet in said aerating compartment to discharge fluid in a direction parallel to the floor and opposite the inlet to provide a roll-like circulation in the aerating compartment, passage means at a lower portion of said baffle for fluid flow between said compartment and means for aerating the fluid discharge through the outlet of said pump, the baffle having an upper wall portion extending across opposite sides of the tank above the fluid level and a lower portion extending at an angle toward the clarifier compartment and terminating a short distance above the floor to provide a steep incline hopper-like surface to funnel any heavier than water solid particles upon the floor of the tank, the fluid passage being defined by the spacing of the bottom edge of the baffle slightly above the floor of the tank and an arcuate baffle positioned above the bottom edge of the lower portion of said baffle to facilitate the internal circular roll-like flow of aerating fluid in said tank effected by discharge of said fluid at high velocity from the pump and provide a directional movement of said solid particles to the inlet of said pump for suction pick up thereby.

11. The treatment tank of claim 10, in which said pump is situated underneath the portion of the baffle extending at an angle and has an inlet opening adjacent a bottom edge of said baffle and in close proximity to the floor of said tank.

* * * * *